(12) United States Patent
Nfonguem et al.

(10) Patent No.: US 10,179,643 B2
(45) Date of Patent: Jan. 15, 2019

(54) APPARATUS AND METHODS FOR ACTUATION OF FLIGHT CONTROL SURFACES

(71) Applicants: Bombardier Inc., Dorval (CA); UNIVERSITE DE SHERBROOKE, Sherbrooke (CA)

(72) Inventors: Gustave Nfonguem, Montreal (CA); Patrick Chouinard, Sherbrooke (CA); Jean-Sebastien Plante, Sherbrooke (CA)

(73) Assignees: BOMBARDIER INC., Dorval (CA); UNIVERSITE DE SHERBROOKE, Sherbrooke (CA)

( * ) Notice: Subject to any disclaimer, the term of this patent is extended or adjusted under 35 U.S.C. 154(b) by 204 days.

(21) Appl. No.: 15/114,532

(22) PCT Filed: Jan. 30, 2015

(86) PCT No.: PCT/IB2015/050728
§ 371 (c)(1),
(2) Date: Jul. 27, 2016

(87) PCT Pub. No.: WO2015/114586
PCT Pub. Date: Aug. 6, 2015

(65) Prior Publication Data
US 2016/0355253 A1 Dec. 8, 2016

Related U.S. Application Data

(60) Provisional application No. 61/933,933, filed on Jan. 31, 2014.

(51) Int. Cl.
*B64C 13/36* (2006.01)
*B64C 13/28* (2006.01)
(Continued)

(52) U.S. Cl.
CPC .............. *B64C 13/36* (2013.01); *B64C 13/28* (2013.01); *B64C 13/34* (2013.01); *F16D 37/008* (2013.01);
(Continued)

(58) Field of Classification Search
CPC ......... B64C 13/36; B64C 13/28; B64C 13/34; F16D 37/008; F16D 37/02; F16H 1/222
See application file for complete search history.

(56) References Cited

U.S. PATENT DOCUMENTS 2,903,110 A * 9/1959 Moody .................. F16D 37/02
192/21.5
3,738,459 A * 6/1973 Geyer ................. F16H 25/2454
192/15
(Continued)

FOREIGN PATENT DOCUMENTS

CN 103153791 A 6/2013
CN 103318404 A 9/2013
(Continued)

OTHER PUBLICATIONS

PCT international Search Report and Written Opinion dated May 8, 2015 re: International Application No. PCT/IB2015/050728.
(Continued)

*Primary Examiner* — Timothy D Collins
*Assistant Examiner* — Tye William Abell
(74) *Attorney, Agent, or Firm* — Norton Rose Fulbright Canada LLP

(57) ABSTRACT

An exemplary apparatus includes a common movable driving member for actuating a plurality of flight control surfaces; a first power transfer device configured to variably adjust power transfer from the common movable driving member to a first of the plurality of flight control surfaces; and a second power transfer device configured to variably
(Continued)

adjust power transfer from the common movable driving member to a second of the plurality of flight control surfaces. The power transferred to the second flight control surface may be adjusted independently of the power transferred to the first flight control surface. Apparatus and methods for actuating flight control surfaces using magneto-rheological fluid or electro-rheological fluid are also disclosed.

18 Claims, 10 Drawing Sheets

(51) Int. Cl.
*F16D 37/00* (2006.01)
*F16D 37/02* (2006.01)
*B64C 13/34* (2006.01)
*F16H 1/22* (2006.01)
*F16D 23/12* (2006.01)

(52) U.S. Cl.
CPC ............. *F16D 37/02* (2013.01); *F16H 1/222* (2013.01); *F16D 2023/123* (2013.01); *F16D 2037/004* (2013.01)

(56) References Cited

U.S. PATENT DOCUMENTS

| | | | |
|---|---|---|---|
| 4,892,274 A * | 1/1990 | Pohl | B64C 9/16 244/213 |
| 6,824,099 B1 * | 11/2004 | Jones | B64C 13/28 244/203 |
| 7,048,234 B2 | 5/2006 | Recksiek et al. | |
| 7,051,975 B2 * | 5/2006 | Pohl | B64C 9/16 244/213 |
| 7,226,020 B2 | 6/2007 | Pohl et al. | |
| 7,494,094 B2 | 2/2009 | Good et al. | |
| 7,556,224 B2 | 7/2009 | Johnson et al. | |
| 7,913,955 B2 | 3/2011 | Jones | |
| 8,622,864 B2 * | 1/2014 | Fauteux | B25J 9/102 475/221 |
| 2004/0245386 A1 * | 12/2004 | Huynh | B64C 9/16 244/99.5 |
| 2005/0151028 A1 * | 7/2005 | Pohl | B64C 13/26 244/213 |
| 2008/0283672 A1 * | 11/2008 | Denzler | B64C 13/28 244/213 |
| 2009/0302516 A1 | 12/2009 | Steele | |
| 2010/0282899 A1 * | 11/2010 | Heintjes | B64C 13/28 244/99.5 |
| 2013/0047772 A1 | 2/2013 | Shafer et al. | |

FOREIGN PATENT DOCUMENTS

| | | |
|---|---|---|
| EP | 1786667 B1 | 12/2009 |
| WO | 2009117827 A1 | 10/2009 |

OTHER PUBLICATIONS

A. Ananiev et al., Driving Redundant Robots by a Dedicated Clutch-Based Actuator, Robot Motion and Control, 2007, pp. 167-176, vol. 360, K. Kozlowski, Ed. London: Springer London.

D. Chapuis et al., A Haptic Knob with a Hybrid Ultrasonic Motor and Powder Clutch Actuator, IEEE, Second Joint EuroHaptics Conference and Symposium on Haptic Interfaces for Virtual Environment and Teleoperator Systems World Haptics Conference, Mar. 22-24, 2007, pp. 200-205, Tsukaba.

P. Fauteux et al., Dual-Differential Rheological Actuator for High-Performance Physical Robotic Interaction, IEEE Transactions on Robotics, 2010, pp. 607-618, vol. 26, No. 4, Canada.

J. Furusho et al., A 6-DOF Rehabilitation Support System for Upper Limbs including Wrists 'Robotherapist' with Physical Therapy, 2007 IEEE 10th International Conference on Rehabilitation Robotics, Jun. 12-15, 2007, pp. 304-309, The Netherlands.

H. Hakogi et al., Torque Control of a Rehabilitation Teaching Robot Using Magneto-Rheological Fluid Clutches, JSME International Journal, 2005, pp. 501-507, Series B, vol. 48, No. 3, Japan.

K. Inagaki et al., A Design of a Walking Robot with Hybrid Actuation System in Climbing and Walking Robots, Springer Berlin Heidelberg, 2006, pp. 767-774, Germany.

A. Inoue et al., Development of a Manipulator with an Opposed-Placement-Type ER Clutch Contributing to Collision Force Reduction, 13th Int. Conf. on Electrorheological Fluids and Magnetorheological Suspensions, IOP Publishing Journal of Physics: Conference Series 412 (2013) 012012, pp. 1-8, Turkey.

N. Patras et al., Electro-Rheological Fluids in the Design of Clutch Systems for Robotic Applications, IEEE Region 10 Conference, Tencon 92, op, 554-558, Nov. 11-13, 1992, Melbourne, Australia.

M. Sakaguchi et al., Development of ER Actuators and their Applications to Force Display Systems, Virtual Reality Annual International Symposium, IEEE, 1998, pp. 66-70, USA.

A. S. Shafer et al., On the Feasibility and Suitability of MR and ER Based Actuators in Human Friendly Manipulators, The 2009 IEEE/RSJ International Conference on Intelligent Robots and Systems, Oct. 11-15, 2009, pp. 2904-2909, USA.

A. S. Shafer et al., On the Feasibility and Suitability of MR Fluid Clutches in Human-Friendly Manipulators, IEEE/ASME Transactions on Mechatronics, Dec. 2011, pp. 1073-1082, vol. 16, Issue 6, USA.

P. Yadmellat et al., Design and Development of a Safe Robot Manipulator Using a New Actuation Concept, IEEE International Conference on Robotics and Automation, 2013, pp. 337-342, Germany.

Y. Yamaguchi, High-Performance 2-D Force Display System Using MR Actuators, IEEE/RSJ International Conference on Intelligent Robots and Systems, Sep. 28-Oct. 2, 2004, pp. 2911-2917, Japan.

The State Intellectual Property Office of the People's Republic of China; Notification of Second Office Action dated Oct. 19, 2017 re: Application No. 201580006647.8.

The State Intellectual Property Office of the People's Republic of China; Notification of First Office Action dated Mar. 1, 2017 re: Application No. 201580006647.8.

English translation of China patent document No. 103318404A dated Sep. 25, 2013, accessed on Apr. 4, 2017 from https://www.google.ca/patents/CN103318404A?dq=CN103318404a&cl=en.

English translation of China patent document No. 103153791A dated Jun. 12, 2013, accessed on Apr. 4, 2017 from https://www.google.ca/patents/CN103153791A?dq=CN103153791a&cl=en.

The State Intellectual Property Office of the People's Republic of China, Notification of Third Office Action dated May 21, 2018 re: Application No. 201580006647.8.

* cited by examiner

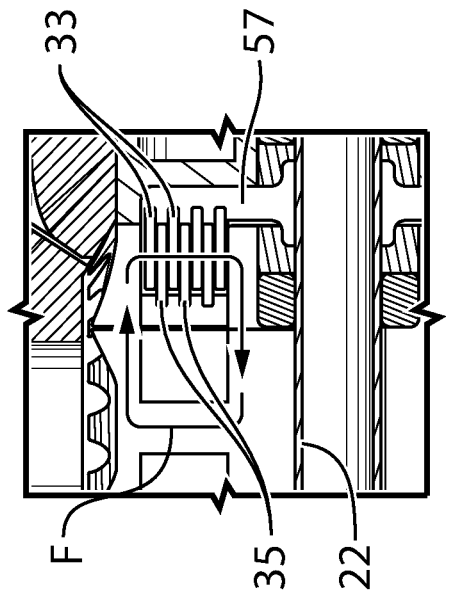
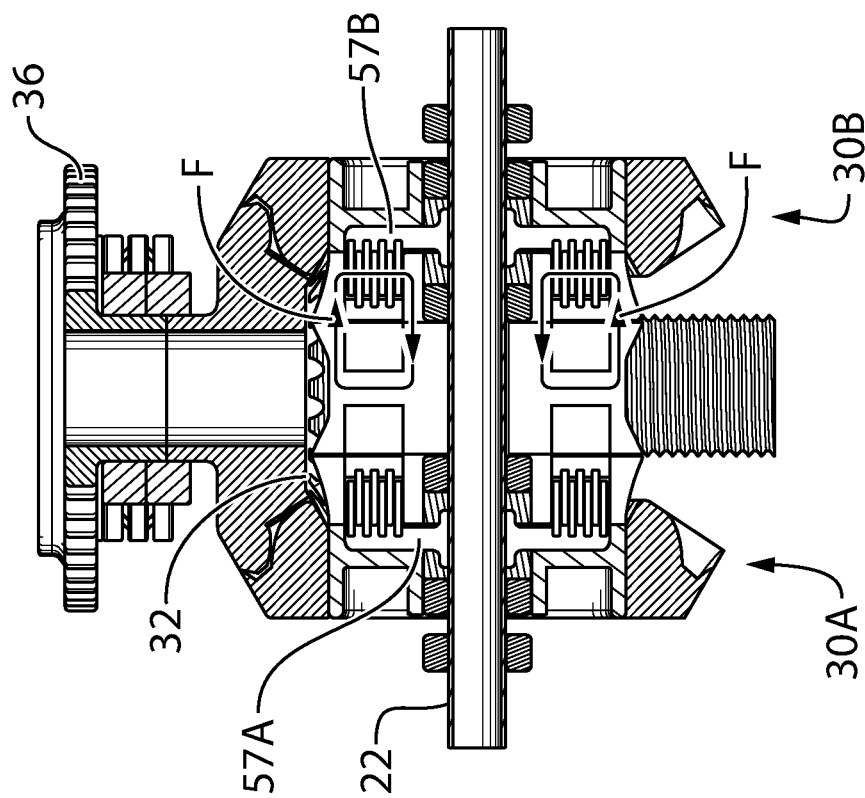
FIG. 7B
FIG. 7A

APPARATUS AND METHODS FOR ACTUATION OF FLIGHT CONTROL SURFACES

CROSS-REFERENCE TO RELATED APPLICATION

This application is a national phase application under 35 U.S.C. 371 of International Patent Application No. PCT/IB2015/050728 filed on Jan. 30, 2015, which claims priority from U.S. Provisional Patent Application Ser. No. 61/933,933 filed on Jan. 31, 2014, the entire content of which is incorporated herein by reference.

TECHNICAL FIELD

The disclosure relates generally to the actuation of flight control surfaces of aircraft, and more particularly to the actuation of high-lift flight control surfaces of fixed-wing aircraft.

BACKGROUND OF THE ART

Many fixed-wing aircraft comprise high-lift flight control surfaces that are deployed and/or retracted to change an amount of lift generated by a wing during some phases of flight. On some aircraft, such high-lift flight control surfaces may comprise a plurality of leading edge slats and also a plurality of trailing edge flaps. For example, a plurality of leading edge slats disposed on a same wing of a fixed-wing aircraft may be mechanically coupled to a common actuator so that they may be deployed and retracted simultaneously in unison. Similarly, a plurality of trailing edge flaps disposed on a same wing of a fixed-wing aircraft may be mechanically coupled to a common actuator so that they may be deployed and retracted simultaneously in unison.

Existing high-lift systems which comprise a plurality of flight control surfaces that can only be actuated simultaneously and in unison can limit the ability to further tailor the performance of the wings of fixed-wing aircraft during some phases of flight. Improvement is therefore desirable.

SUMMARY

The disclosure describes systems, components, apparatus and methods useful in the actuation of flight control surfaces of aircraft. The disclosure also describes systems, components, apparatus and methods useful in the differential actuation of flight control surfaces such as high-lift control surfaces of fixed-wing aircraft. The differential actuation of the flight control surfaces may comprise the transfer of power from a common source to a plurality of flight control surfaces in an independent manner. The disclosure also describes systems, components, apparatus and methods useful in the transfer of power to one or more flight control surfaces via magneto-rheological fluid or electro-rheological fluid.

In one aspect, the disclosure describes an apparatus for differentially actuating a plurality of flight control surfaces of a fixed-wing aircraft. The apparatus comprises: a common movable driving member for actuating the plurality of flight control surfaces; a first power transfer device configured to variably adjust power transfer from the common movable driving member to a first of the plurality of flight control surfaces; and a second power transfer device configured to, independently of the power transferred to the first flight control surface, variably adjust power transfer from the common movable driving member to a second of the plurality of flight control surfaces.

At least one of the first power transfer device and the second power transfer device may comprise one of magneto-rheological fluid and electro-rheological fluid.

The first power transfer device may be configured to permit deployment and retraction of the first flight control surface based on actuation of the movable driving member in a first direction.

The second power transfer device may be configured to permit deployment and retraction of the second flight control surface based on actuation of the movable driving member in the first direction.

The first power transfer device may comprise a first clutch and a second clutch cooperating to permit deployment and retraction of the first flight control surface. At least one of the first clutch and the second clutch may comprise one of magneto-rheological fluid and electro-rheological fluid.

At least one of the first power transfer device and the second power transfer device may comprise a clutch configured for controllable slippage.

The first power transfer device may be configured to permit adjustment of an actuation speed of the first flight control surface based on actuation of the movable driving member at a constant speed.

The second power transfer device may be configured to permit adjustment of an actuation speed of the second flight control surface independently of the actuation of the first flight control surface.

The apparatus may comprise a first brake for holding the first flight control surface at a first desired position and a second brake for holding the second flight control surface at a second desired position.

Each of the one or more flight control surfaces may comprise a high-lift flight control surface. For example, each of the one or more flight control surfaces may comprise a trailing edge flap.

In another aspect, the disclosure describes an apparatus for actuating a flight control surface of a fixed-wing aircraft. The apparatus comprises: a source of power for actuating the flight control surface; and a power transfer device configured to transfer power from the source of power to the flight control surface, the power transfer device comprising one of magneto-rheological fluid and electro-rheological fluid.

The source of power may comprise a rotatable driving member.

The power transfer device may be configured to permit deployment and retraction of the flight control surface based on rotation of the rotatable driving member in a first direction.

The power transfer device may comprise a first clutch and a second clutch cooperating to permit deployment and retraction of the flight control surface.

The first clutch and the second clutch may comprise one of magneto-rheological fluid and electro-rheological fluid.

The power transfer device may be configured to permit adjustment of an actuation speed of the flight control surface based on rotation of the rotatable driving member at a constant speed.

The apparatus may comprise a linear actuator configured to transfer power from the power transfer device to the flight control surface.

The linear actuator may comprise a nut engaged with a screw.

The flight control surface may comprise a trailing edge flap.

In another aspect, the disclosure describes an apparatus for differentially actuating a plurality of actuatable members, the apparatus comprising:

a common movable driving member for actuating the plurality of actuatable members;

a first power transfer device configured to variably adjust power transfer from the common movable driving member to a first of the plurality of actuatable members; and a second power transfer device configured to, independently of the power transferred to the first actuatable member, variably adjust power transfer from the common movable driving member to a second of the plurality of actuatable members.

At least one of the first power transfer device and the second power transfer device may comprise one of magneto-rheological fluid and electro-rheological fluid.

In another aspect, the disclosure describes a method for differentially actuating a plurality of flight control surfaces of a fixed-wing aircraft using a common movable driving member. The method comprises: variably adjusting the power transferred from the common movable driving member to a first of the plurality of flight control surfaces; and independently of the power transferred to the first flight control surface, variably adjusting the power transferred from the common movable driving member to a second of the plurality of flight control surfaces.

Variably adjusting the power transferred from the common movable driving member to at least one of the first flight control surface and the second flight control surface may comprise one of subjecting magneto-rheological fluid to a magnetic field and subjecting electro-rheological fluid to an electric field.

The method may comprise:

adjusting the power transferred from the common movable driving member to the first flight control surface to cause deployment of the first flight control surface based on actuation of the common movable driving member in a first direction;

adjusting the power transferred from the common movable driving member to the first flight control surface and engaging a first brake associated with the first flight control surface to cause stopping of the first flight control surface; and adjusting the power transferred from the common movable driving member to the first flight control surface to and at least partially disengaging the first brake cause retraction of the first flight control surface based on actuation of the common movable driving member in the first direction.

The method may comprise:

adjusting the power transferred from the common movable driving member to the second flight control surface to cause deployment of the second flight control surface based on actuation of the common movable driving member in the first direction;

adjusting the power transferred from the common movable driving member to the second flight control surface and engaging a second brake associated with the second flight control surface to cause stopping of the second flight control surface; and adjusting the power transferred from the common movable driving member to the second flight control surface and at least partially disengaging the second brake to cause retraction of the second flight control surface based on actuation of the common movable driving member in the first direction.

The method may comprise actuating the first flight control surface and the second flight control surface in opposite directions while the common movable driving member is actuated in a first direction.

The method may comprise adjusting an actuation speed of the first flight control surface while the common movable driving member is actuated at a constant speed.

The method may comprise adjusting an actuation speed of the second flight control surface while the common movable driving member is actuated at the constant speed.

The method may comprise adjusting an actuation speed of the second flight control surface independently of the actuation of the first flight control surface.

The method may comprise adjusting the power transferred from the common movable driving member to actuate the first flight control surface and the second flight control surface at different actuation speeds.

Each of the first flight control surface and the second flight control surface may comprise a high-lift flight control surface. For example, each of the first flight control surface and the second flight control surface may comprise a trailing edge flap on a same wing of the fixed-wing aircraft.

The method may comprise:

releasing a first brake associated with the first flight control surface prior to variably adjusting the power transferred from the common movable driving member to the first flight control surface; and releasing a second brake associated with the second flight control surface prior to variably adjusting the power transferred from the common movable driving member to the second flight control surface.

In another aspect, the disclosure describes a method for actuating a flight control surface of a fixed-wing aircraft. The method may comprise: activating a source of power; one of subjecting magneto-rheological fluid to a magnetic field and subjecting electro-rheological fluid to an electric field to cause transfer of power from the source of power to the flight control surface.

The method may comprise adjusting an intensity of the magnetic or electric field to adjust an actuation speed of the flight control surface.

The method may comprise:

subjecting a first quantity of magneto-rheological fluid to a first magnetic field to cause deployment of the flight control surface;

at least partially removing the first magnetic field from the first quantity of magneto-rheological fluid; and subjecting a second quantity of magneto-rheological fluid to a second magnetic field to cause retraction of the flight control surface.

The method may comprise:

subjecting a first quantity of electro-rheological fluid to a first electric field to cause deployment of the flight control surface;

at least partially removing the first electric field from the first quantity of electro-rheological fluid; and subjecting a second quantity of electro-rheological fluid to a second electric field to cause retraction of the flight control surface The source of power may comprise motion of a driver. The motion of the driver may be in a single direction. The motion of the driver may be at a constant speed.

The flight control surface may comprise a trailing edge flap.

In a further aspect, the disclosure describes a method for actuating a flight control surface of a fixed-wing aircraft using a movable driving member being actuated in a first direction. The method comprises: adjusting the power transferred from the movable driving member to the flight control surface to cause deployment of the flight control surface based on actuation of the movable driving member in the first direction; adjusting the power transferred from the movable driving member to the flight control surface and engaging a brake associated with the flight control surface to cause stopping of the flight control surface; and adjusting the power transferred from the common movable driving member to the flight control surface and at least partially disengaging the brake to cause retraction of the flight control surface based on actuation of the movable driving member in the first direction.

The actuation of the movable driving member may comprise rotation of the movable driving member.

In another aspect, the disclosure describes a fixed-wing aircraft comprising an apparatus as disclosed herein.

Further details of these and other aspects of the subject matter of this application will be apparent from the detailed description and drawings included below.

DESCRIPTION OF THE DRAWINGS

Reference is now made to the accompanying drawings, in which:

FIGS. 7A and 7B are schematic axial cross section views of exemplary clutches of the power transfer device of FIG. 5;

DETAILED DESCRIPTION

Aspects of various embodiments are described through reference to the drawings.

The present disclosure relates to the actuation of flight control surfaces of aircraft. In various embodiments, the present disclosure describes systems, components, apparatus and methods useful in the actuation of flight control surfaces of aircraft or other actuatable members. The systems, components, apparatus and methods disclosed herein may, for example, be useful in the differential actuation of high-lift flight control surfaces such as leading edge slats and/or trailing edge flaps of fixed-wing aircraft. However, it is understood that systems, components, apparatus and methods disclosed herein may be used in conjunction with other types of flight control surfaces and with other types of aircraft than those exemplified herein. Differential actuation of flight control surfaces, as referenced in the present disclosure, is intended to encompass actuation of two or more flight control surfaces by different amounts (e.g., to achieve different position settings relative to each other) whether via simultaneous actuation or not (e.g., including separate actuation at different times). It is also understood that, in various embodiments, the systems, components, apparatus and methods disclosed herein may be used for other type(s) of actuation including, for example, simultaneous actuation of a plurality of flight control surfaces in unison (i.e., synchronously) or the actuation of a single flight control surface. It is also understood that, the systems, components, apparatus and methods disclosed herein may be used in conjunction with actuatable members (e.g., in aerospace or non-aerospace applications) other than those exemplified herein.

In some embodiments, the systems, components, apparatus and methods disclosed herein may, for example, permit the tailoring of a lift distribution along a spanwise direction of a wing of a fixed-wing aircraft (e.g., during flight). For example, the differential actuation of high-lift surfaces along a wing may be used to selectively adjust the camber of the wing by different amounts at different spanwise locations of the wing by deploying individual high-lift surfaces disposed at different spanwise locations of the wing by different amounts. Among other benefits, the selective tailoring of the lift distribution along the spanwise direction of the wing may permit, for example, shifting a resultant lift force on a wing closer to the root of the wing (i.e., inboard) to alleviate the bending moment induced on the wing by the lift generated by the wing. Other spanwise lift distributions may be suitable for different phases of flight and/or conditions.

Figure 1:
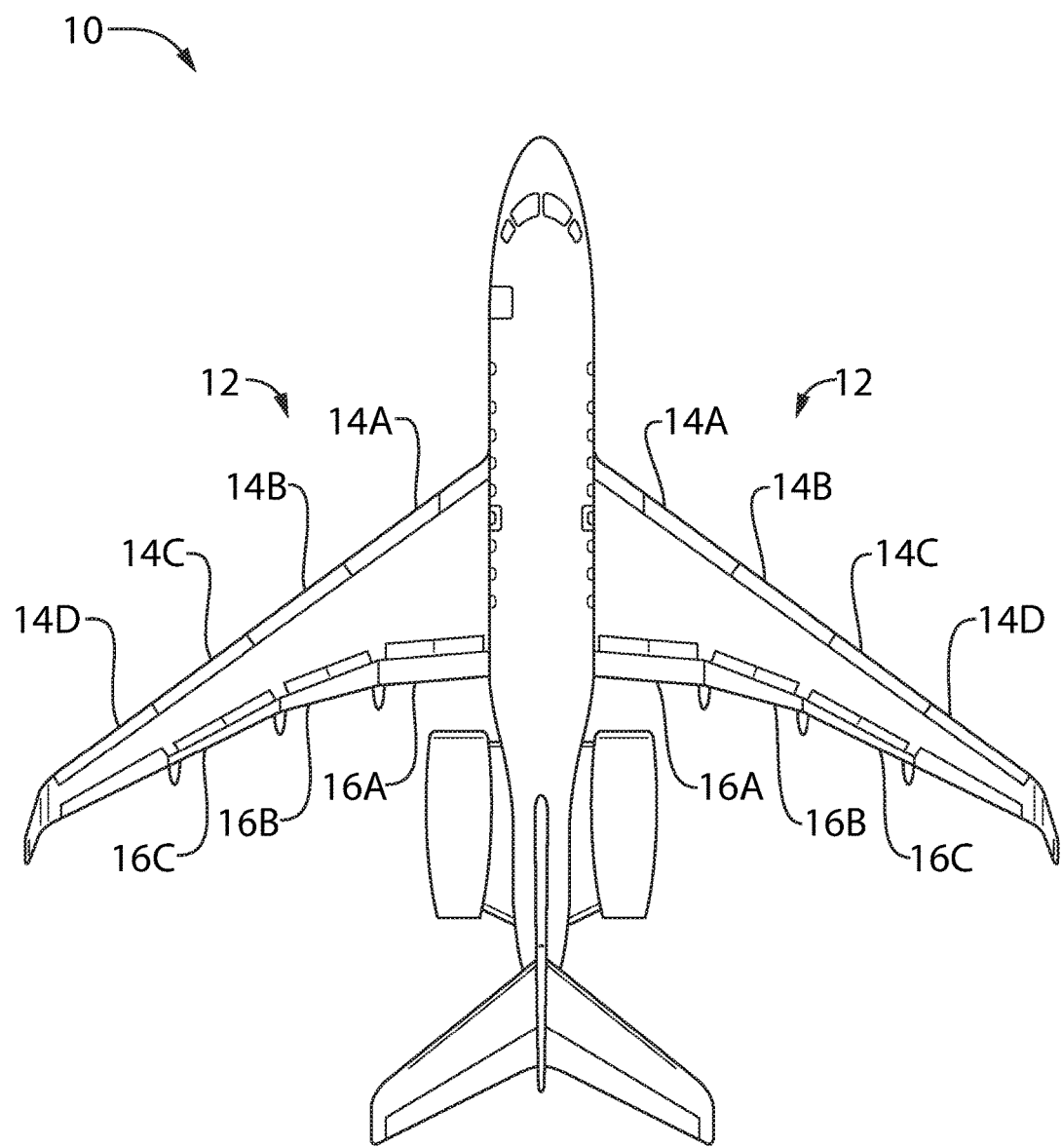
FIG. 1 is a top plan view of an exemplary fixed-wing aircraft.

FIG. 1 illustrates a top plan view of an exemplary aircraft 10, with which one or more of the systems, components, apparatus and methods of the present disclosure may be incorporated. Aircraft 10 may, for example, include any suitable aircraft such as corporate, private, commercial or any other type of aircraft that may comprise one or more flight control surfaces. Aircraft 10 may be a fixed-wing aircraft. For example, aircraft 10 may be a narrow-body, twin engine jet airliner. Accordingly, aircraft 10 may comprise wings 12 where each wing 12 may comprise one or more flight control surfaces (e.g., actuatable members). For example, each wing 12 may comprise one or more high-lift flight control surfaces including one or more leading edge slats 14A-14D and/or one or more trailing edge flaps 16A-16C. Leading edge slats 14A-14D may comprise a plurality of surfaces distributed in a spanwise direction along wing 12 and disposed at or near a trailing edge of wing 12. Trailing edge flaps 16A-16C may also comprise a plurality of surfaces distributed in a spanwise direction along wing 12 and may be disposed at or near a trailing edge of wing 12. In various embodiments, leading edge slats 14A-14D and/or trailing edge flaps 16A-16C may be considered "high-lift" surfaces that may be deployed to increase an amount of lift generated by wings 12 when deployed. For example, leading edge slats 14A-14D and/or trailing edge flaps 16A-16C may be deployed, on ground, during landing, take-off and/or during any other appropriate phases of flight or conditions requiring increased lift. It is understood that each wing 12 may comprise a different number of movable flight control surfaces and/or comprise other type(s) of flight control surfaces. For example, in addition to high-lift flight control surfaces 14, 16, each wing 12 may also comprise one or more spoilers and/or one or more ailerons.

Figure 2:
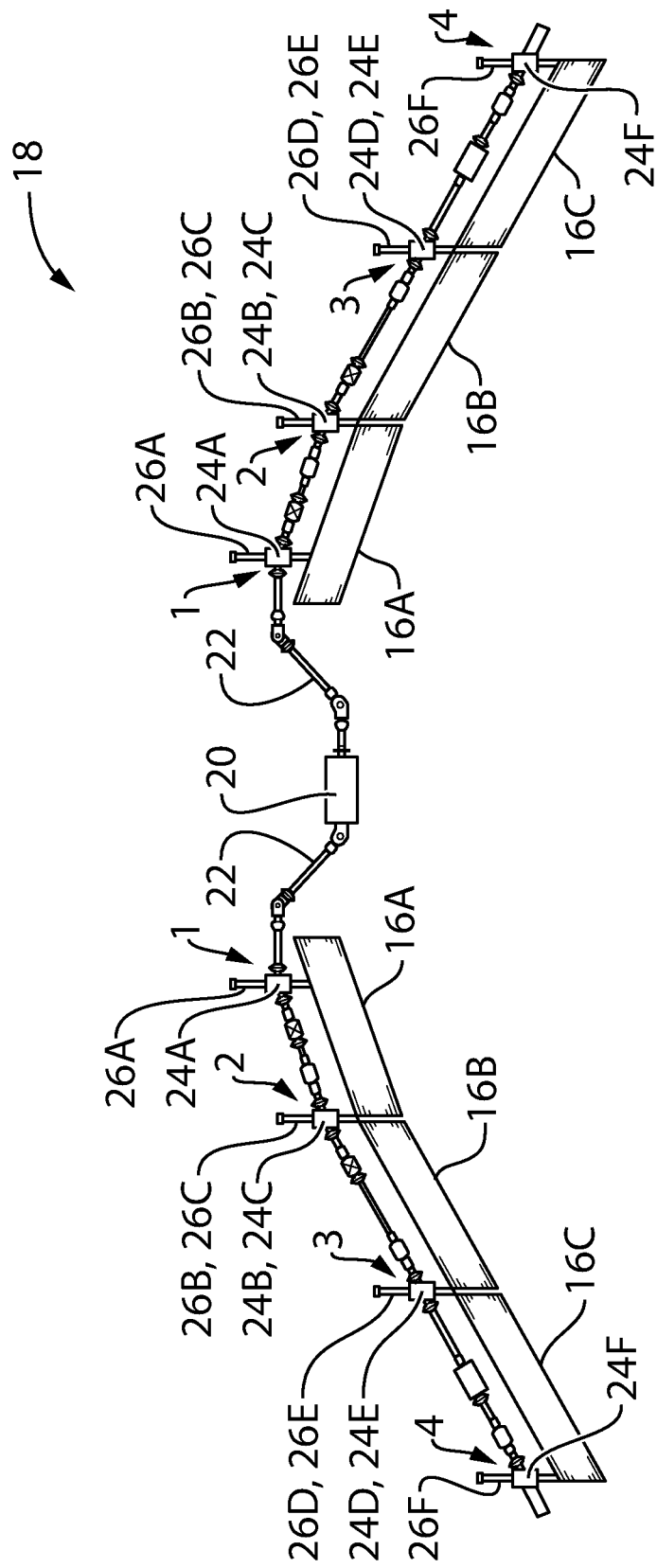
FIG. 2 is a top plan view of an exemplary system for actuating a plurality of flight control surfaces of the aircraft of FIG. 1.

FIG. 2 is a top plan view of an exemplary actuation system 18 comprising a plurality of flight control surfaces of aircraft 10. While system 18 is illustrated as comprising trailing edge flaps 16A-16C, it is understood that systems in accordance with the present disclosure could, in addition or alternatively, comprise leading edge slats 14A-14D and/or other flight control surfaces of aircraft 10. Accordingly, the components, apparatus and methods of the present disclosure may not be limited to the actuation of high-lift surfaces 14, 16.

System 18 may comprise one or more power drive units (PDU) 20 (referred hereinafter as "PDU 20") and one or more driving members 22 (referred hereinafter as "driving member 22") driven by PDU 20. Trailing edge flight control surfaces 16A-16C may be driven by PDU 20 via driving member 22. PDU 20 may, for example, comprise a suitably controlled electrical or hydraulic motor or any other source of power suitable for actuating driving member 22. Driving member 22 may comprise one or more movable (e.g., rotatable) members. For example, driving member 22 may comprise one or more shafts also known as "torque tubes" extending substantially spanwise along wings 12 in order to mechanically couple trailing edge flaps 16A-16C to PDU 20. Driving member 22 may comprise a plurality of torque tube sections mechanically coupled via suitable known or other couplings to form a common drive line for actuating (e.g., transferring power to) flight control surfaces 16A-16C.

System 18 may also comprise one or more power transfer devices 24A-24F and one or more actuators 26A-26F schematically shown in FIG. 2. Power transfer devices 24 and actuators 26 may serve to transfer power between driving member 22 and flight control surfaces 16. FIG. 2 shows two groups of stations labeled 1, 2, 3 and 4 (i.e., one group of stations for each wing 12 of aircraft 10) where power may be transferred between driving member 22 and flight control surfaces 16A-16B. For each wing 12 of aircraft 10, station 1 may comprise power transfer device 24A and actuator 26A for transferring power between driving member 22 and flight control surface 16A. Station 2 may comprise power transfer device 24B and actuator 26B for transferring power between driving member 22 and flight control surface 16A, and, power transfer device 24C and actuator 26C for transferring power between driving member 22 and flight control surface 16B. Station 3 may comprise power transfer device 24D and actuator 26D for transferring power between driving member 22 and flight control surface 16B, and, power transfer device 24E and actuator 26E for transferring power between driving member 22 and flight control surface 16C. Station 4 may comprise power transfer device 24F and actuator 26F for transferring power between driving member 22 and flight control surface 16C.

As explained further below, power transfer devices 24 may be configured to permit variable adjustment of power transferred between driving member 22 and flight control surfaces 16. Accordingly, one or more power transfer devices 24 and one or more corresponding actuators 26 may be provided for each flight control surface 16. Power transfer devices 24 may be independently controllable so that the transfer of power to one of flight control surfaces 16 may be controlled independently of the transfer of power to another of flight control surfaces 16. Actuators 26 may each comprise a linear, rotary or other type of actuator. For example, actuators 26 may comprise screw/nut actuators (e.g., ballscrew or roller screw), rack-and-pinion actuators and/or other suitable known or other type of actuators.

Figure 3:
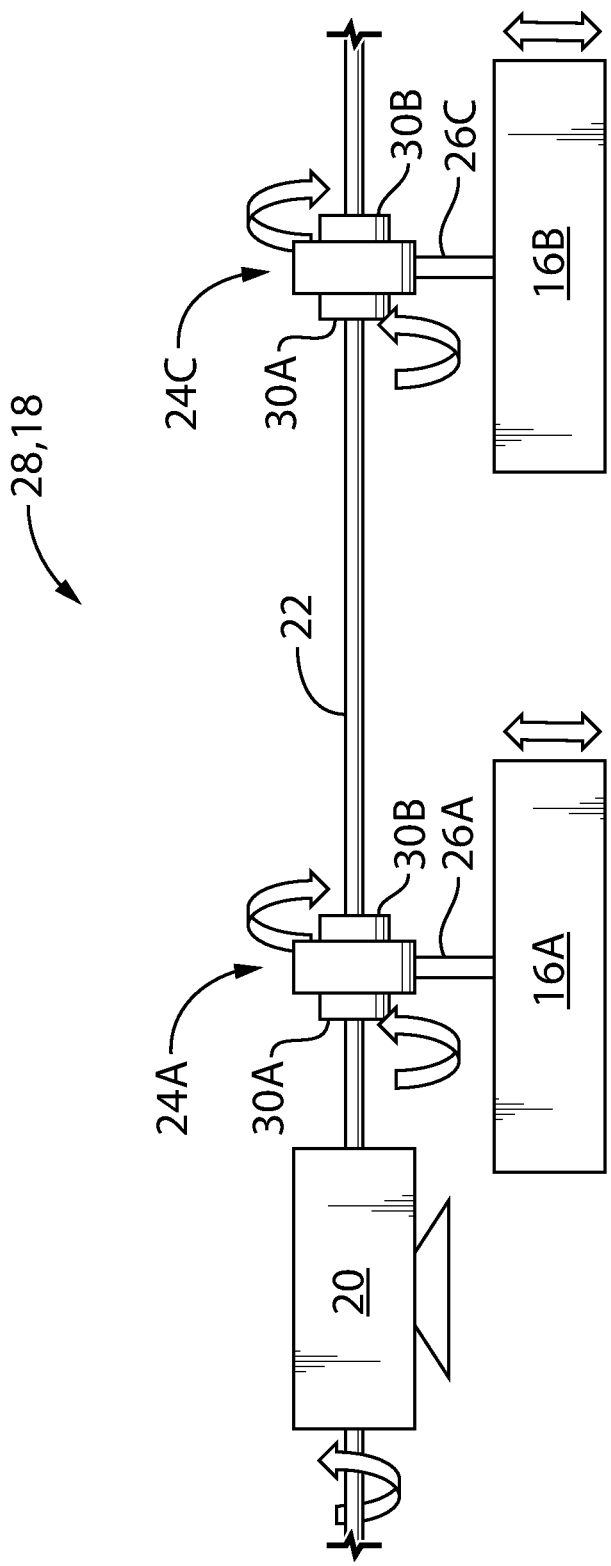
FIG. 3 is a schematic representation of exemplary power transfer devices part of the system of FIG. 2.

FIG. 3 is a schematic representation of apparatus 28, which may be part of system 18, for actuating a plurality of flight control surfaces 16 using power transfer devices 24 and actuators 26. Each flight control surface 16 may be associated with one or more dedicated and optionally independently controlled power transfer devices 24 so that the actuation (e.g., deployment and retraction) of flight control surfaces 16 may be conducted differentially or in unison. In the case of simultaneous actuation of flight control surfaces 16A and 16B, the control of power transfer devices 24A and 24C may be coordinated to achieve differential actuation (e.g., at different speeds and/or in different directions) of flight control surfaces 16A and 16B or actuation of flight control surfaces 16A and 16B in unison. The independent control of power transferred to each control surface 16A and 16B may also permit completely independent actuation of flight control surfaces 16A and 16B so that the selective actuation of one or more flight control surfaces 16 may be achieved separately of other one(s) of flight control surfaces 16. In any case, the differential deployment and retraction of flight control surfaces 16 may provide added flexibility in tailoring the performance of wings during flight depending on the phase of flight or other operating condition(s).

Each power transfer device 24 may serve to selectively couple and decouple an associated flight control surface 16 to and from driving member 22. In various embodiments, power transfer device 24 may be configured to variably adjust (e.g., as opposed to ON/OFF only) the transfer of power from driving member 22 to an associated flight control surface 16. The variable adjustment of power transfer between driving member 22 and the associated flight control surface 16 may comprise the gradual adjustment of an amount of power being transferred to flight control surface 16. For example, the variable adjustment of power transfer may comprise adjusting to an intermediate amount of power between a minimum value (e.g., zero) where the associated flight control surface 16 is substantially decoupled from driving member 22 and a maximum value where the associated flight control surface 16 is fully coupled to driving member 22.

In various embodiments, each power transfer device 24 may be configured to permit controlled slippage between an associated actuator 26 and driving member 22. For example, each power transfer device 24 may comprise one or more clutches 30A, 30B to variably adjust the transfer of power between driving member 22 and an associated one or more flight control surfaces 16. Clutches 30A, 30B may comprise any suitable device(s) that may be used to selectively couple (engage) and decouple (disengage) one or more flight control surfaces 16 to/from driving member 22. Clutches 30A, 30B may be controllable such that the level of coupling may be variably adjusted so that the amount of power transferred through each clutch 30 may also be variably adjusted. As explained below, one or more of clutches 30 may comprise magneto-rheological (MR) fluid that may be used to establish power transfer between driving member 22 and flight control surface(s) 16 when subjected to a magnetic field.

Clutches 30A and 30B in each power transfer device 24 may be configured to permit both deployment and retraction of each flight control surface 16 even though driving member 22 may be actuated in only one (i.e., constant) direction. For example, clutch 30A may be used to couple actuator 26A to driving member 22, while clutch 30B is disengaged, to cause actuator 26A to be actuated in a first direction corresponding to the deployment of flight control surface 16A. Alternatively, clutch 30B may be used to couple actuator 26A to driving member 22, while clutch 30A is disengaged, to cause actuator 26A to be actuated in a second direction corresponding to the retraction of flight control surface 16A. Accordingly, the use of clutches 30A and 30B may, in some embodiments, permit deployment and retraction of flight control surface 16A without having to reverse the direction of motion (e.g., rotation) of driving member 22. The variable adjustment of power transfer via clutches 30 may also permit a speed of deployment and retraction of flight control surfaces 16 to be varied without necessarily having to vary the speed of actuation of driving member 22. In various embodiments, driving member 22 may be rotated in one direction and at constant or variable speed and the use of power transfer devices 24 may still permit deployment and retraction of flight control surfaces 16 while also permitting the variation of actuation speed of flight control surfaces 16. For example, the rotation speed of driving member 22 may be adjusted via PDU 20 based on the maximum speed of one or more of the flight control surfaces 16 being actuated.

In some embodiments, actuation system 18 may provide improved reliability in comparison with some existing systems especially in the event of a jam or other failure of one of actuators 26. For example, in cases where two or more power transfer devices 24 and corresponding actuators 26 are associated with a flight control surface 16, clutches 30A, 30B of a power transfer device 24 associated with a failed actuator 26 may be disengaged so that the associated flight control surface 16 may still be actuated via the other remaining (e.g., healthy) power transfer device(s) 24 and actuator(s) 26. In other words, the failed actuator 26 may be isolated while the functionality of the associated flight control surface 16 may be at least partially maintained. Also, in a condition where one flight control surface 16 would be rendered inoperable due to a failure of an associated actuator 26 or other condition, that inoperable flight control surface 16 could, for example, be decoupled from moving member 22 via the disengagement of associated clutches 30A, 30B and thereby permit the other (e.g., healthy) flight control surface(s) 16 to still be actuated. In such situation, the inoperable flight control surface 16 could also be locked in place via a suitable brake (described below) while being decoupled from driving member 22.

Figure 4:
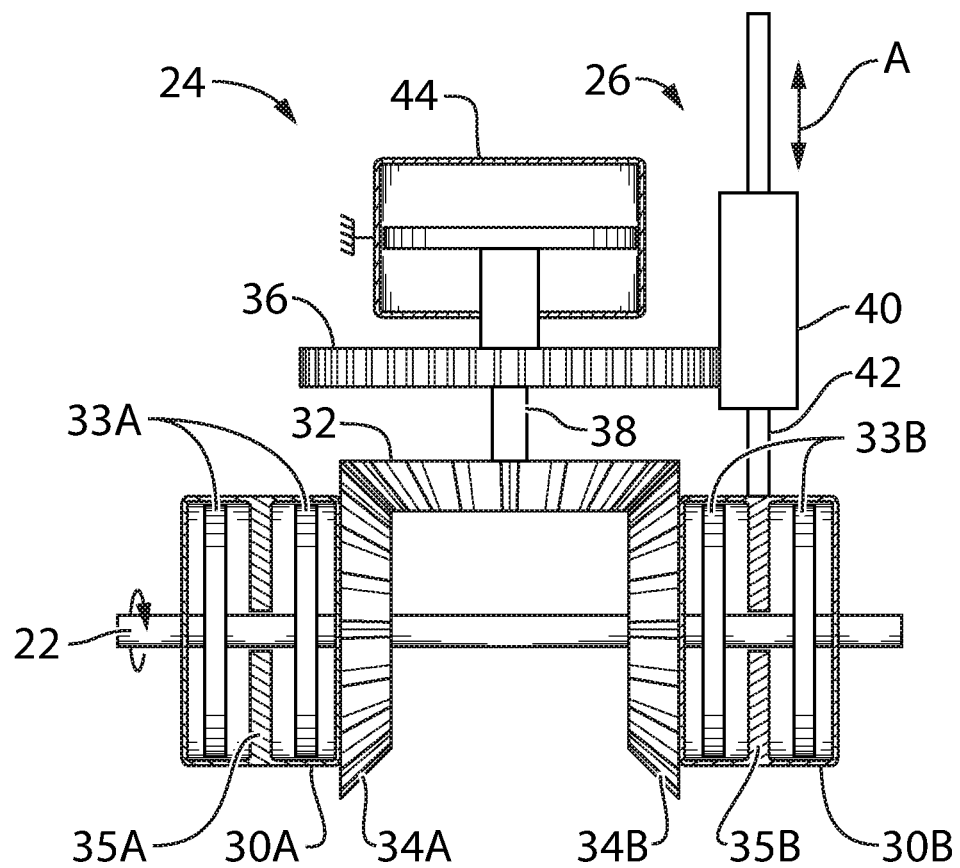
FIG. 4 is a detailed schematic representation of a power transfer device of FIG. 3.

FIG. 4 is a more detailed schematic representation of exemplary power transfer device 24. Power transfer device 24 may comprise central gear 32 that may be coupled to (i.e., meshed with) both clutch gears 34A and 34B. One or more driving rotors 33A and 33B may be fixedly coupled to driving member 22 so that the rotation of driving member 22 may cause the rotation of driving rotors 33A and 33B. Similarly one or more driven rotors 35A and 35B may be fixedly coupled to each of gears 34A and 34B so that driven rotor(s) 35A may rotate together with gear 34A and driven rotor(s) 35B may rotate together with gear 34B. Driving rotors 33A, 33B may be disposed adjacent to driven rotors 35A, 35B of corresponding clutches 30A, 30B and may be used to cause engagement of clutches 30A, 30B as described below.

When clutch 30A is engaged and clutch 30B is disengaged, central gear 32 may be driven in a first direction by clutch gear 34A while clutch gear 34B is permitted to turn freely. Alternatively, when clutch 30B is engaged and clutch 30A is disengaged, central gear 32 may be driven in a second direction by clutch gear 34B while clutch gear 34A is permitted to turn freely. Intermediate gear 36 may be driven via central gear 32 and shaft 38 and serve to transfer rotational movement to nut 40 of actuator 26. Nut 40 may also comprise a gear (shown in FIG. 9B) for meshing with intermediate gear 36. The rotation of nut 40 may cause translation of screw 42 along arrow A (e.g., up or down as shown in FIG. 4). Consequently, rotation of central gear 32 in the first direction may cause translation of screw 42 in the upward direction in relation to FIG. 4 and cause deployment of an associated flight control surface 16. Alternatively, rotation of central gear 32 in the second (e.g., opposite) direction may cause translation of screw 42 in the downward direction in relation to FIG. 4 and thereby cause retraction of the associated flight control surface 16.

Power transfer device 24 may also comprise one or more suitable brakes 44 of known or other type, which may be useful in holding an associated flight control surface 16 at a desired position (e.g., partially or fully deployed, retracted). In any case, brake 44 may, when activated, be configured to prevent rotation of shaft 38 to prevent rotation of nut 40 and thereby prevent movement of screw 42 of actuator 26. Brake 44 may serve to substantially hold a position of an associated flight control surface 16 during flight or other situations where clutches 30A and 30B may be disengaged. Accordingly, one or more brakes 44 may be configured to withstand expected wind or other loads on the associated flight control surface 16 and substantially prevent one or more actuators 26 to be back-driven under such loads. Brake(s) 44 may also serve as one or more semi-active dampers for flutter prevention. In some situations, clutches 30A and 30B may be disengaged when brake 44 is activated and is holding an associated flight control surface 16 in position in order to permit driving member 22 to continue to rotate and optionally actuate one or more other flight control surfaces 16. Conversely, brake(s) 44 may be partially or fully disengaged (i.e., released) when one of clutches 30A and 30B is engaged and flight control surface 16 is actuated.

Figure 5:
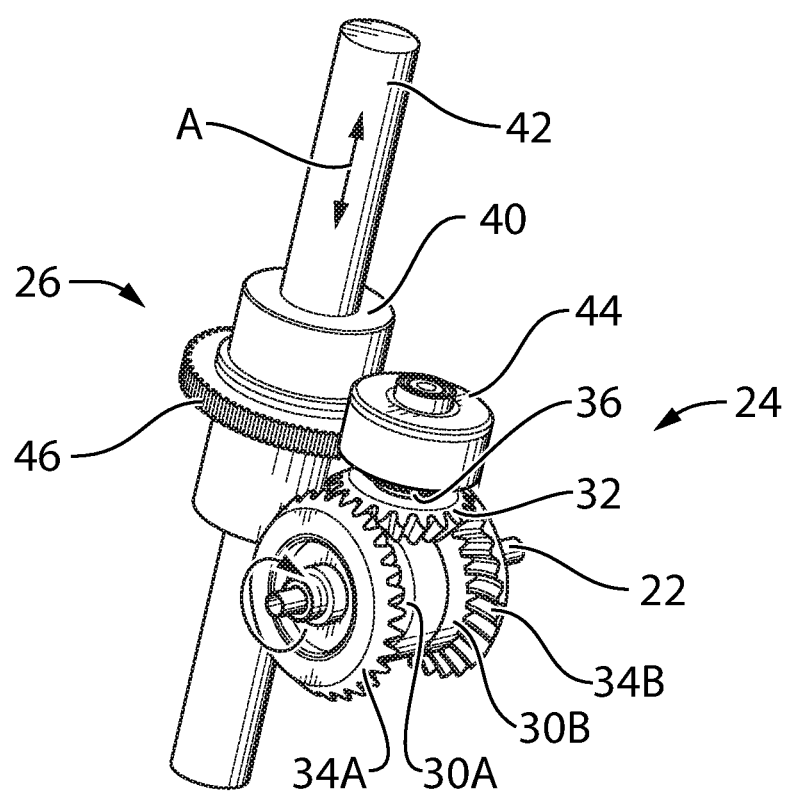
FIG. 5 is an axonometric view of the power transfer device of FIG. 4.

FIG. 5 is an axonometric view of power transfer device 24 as illustrated in FIG. 4. FIG. 5 additionally shows nut gear 46 which may be meshed with intermediate gear 36 to cause rotation of nut 40. While FIGS. 4 and 5 illustrate actuator 26 as being a linear screw-type (e.g., ball-screw or roller screw) actuator, it should be understood that other types of actuators (e.g., linear or rotary) could also be used in conjunction with power transfer devices 24.

Figure 6:
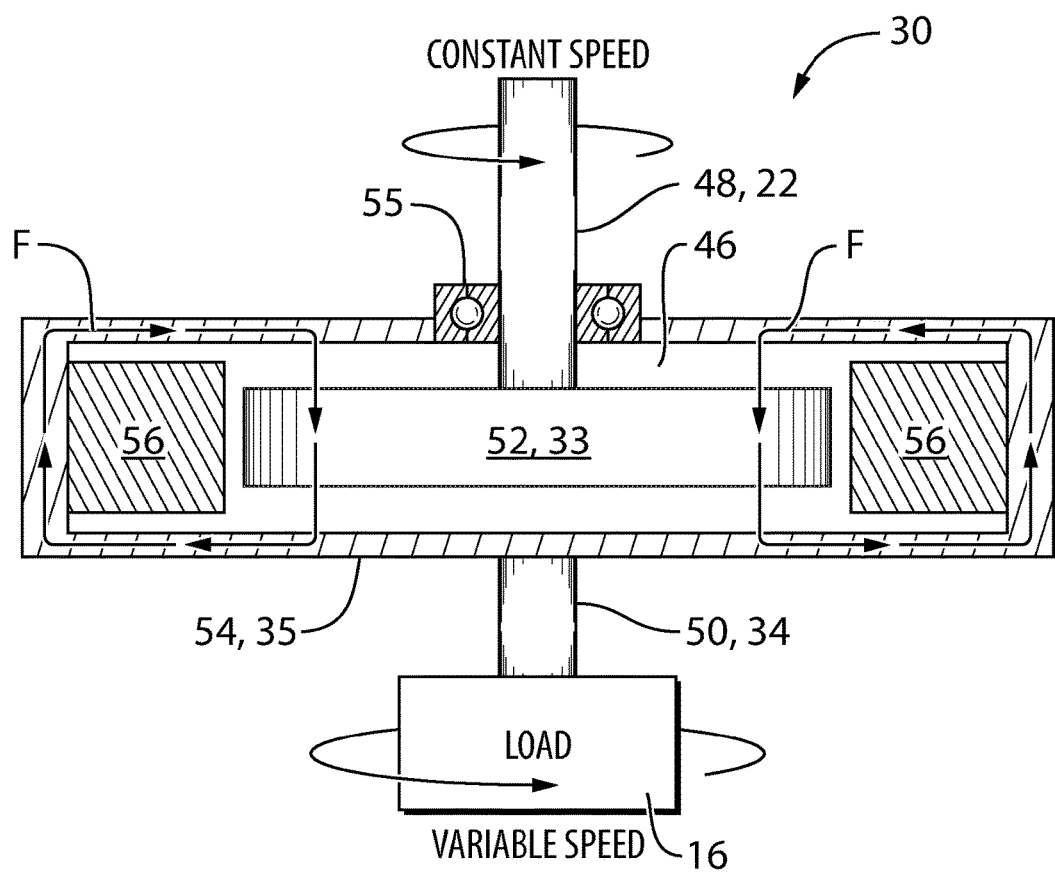
FIG. 6 is a schematic representation of an exemplary clutch of the power transfer device of FIG. 5.

FIG. 6 is a schematic representation of an exemplary clutch 30 of a type suitable for use in power transfer device 24. As mentioned above, one or more of clutches 30 may comprise a suitable MR fluid 46. However, in various embodiments, one or more of clutches 30 could be modified to use one or more electro-rheological (ER) fluids instead of or in addition to MR fluid 46. Even though the present disclosure makes reference to MR fluid 46, other "smart" fluids, such as ER fluid, could be used instead of MR fluid 46 and could be appropriate in some embodiments and applications. In any case, MR fluid 46 may, for example, comprise a base oil containing ferromagnetic particles. MR fluid 46 may include any suitable MR fluid including hydrocarbon-based MR fluids such as product number MRF-140CG sold under the trade name LORD and Basonetic® 5030 sold under the trade name BASF. Clutch 30 may comprise input 48, which may comprise driving member 22, and output 50, which may comprise one of clutch gears 34A, 34B. Output 50, 34 may be directly or indirectly coupled to a load which may comprise one or more flight control surfaces 16. Input 48, 22 may be fixedly coupled to rotor 52, which may be analogous to driving rotor 33 of FIG. 4, disposed inside of housing 54, which may be analogous to driven rotor 35 of FIG. 4. Housing 54 may be fixedly coupled to output 50. The space between rotor 52 and housing 54 may comprise a quantity of MR fluid 46. Accordingly rotor 52, 33 and housing 54, 35 may function as clutch plates which may be engaged and disengaged by controlling the viscosity (shear strength) of MR fluid 46.

One or more bearings 55 or other relatively low-friction engagement may be interposed between input 48, 22 and housing 54.

Clutch 30 may also comprise one or more coils 56 (referred hereinafter as "coil 56"), which may be magnetically coupled to the quantity of MR fluid 46. In various embodiments, coil 56 may, for example, be physically disposed inside of housing 54. Coil 56 may be coupled to a suitable power supply (not shown in FIG. 6) that may be configured to permit control of a magnetic field generated via coil 56. An exemplary magnetic field is illustrated by loops/arrows "F" shown in FIG. 6. Magnetic field F may comprise one or more loops through housing 54, rotor 52 and MR fluid 46. The exposure of MR fluid 46 to magnetic field F may cause the viscosity of MR fluid 46 to increase and thereby cause engagement of rotor 52 and housing 54. Variable adjustment of the intensity of magnetic field F may in turn cause variable adjustment of the viscosity of MR fluid 46 and consequently cause variable adjustment of the power transfer via rotor 52 and housing 54. For example, by controlling the intensity of magnetic field F, the viscosity of MR fluid 46 may be varied between a minimum value where rotor 52 and housing 54 can rotate substantially freely relative to each other and a maximum value where rotor 52 and housing 54 are engaged (e.g., stuck together) and rotate together. Accordingly, the adjustment of the intensity of magnetic field F may be used to modulate the viscosity of MR fluid 46 to control the slippage of clutch 30 and thereby control the torque and speed transmitted from driving member 22 to an associated flight control surface 16. When using an ER fluid instead of a MR fluid, an electric field could be used instead of a magnetic field to activate the ER fluid to cause engagement of clutches 30A, 30B.

FIGS. 7A and 7B are schematic axial cross section views of clutches 30A, 30B of power transfer device 24. Clutch 30A may serve to cause deployment of flight control surface 16 (not shown in FIG. 7A) when engaged and clutch 30B may serve to cause retraction of flight control surface 16 when engaged. FIG. 7A shows the application of magnetic field F for the purpose of causing engagement of clutch 30B and consequently cause retraction of flight control surface 16. A similar magnetic field (not shown) may be applied in clutch 30A for causing deployment of flight control surface 16. It should be understood that magnetic field F may be applied to one of clutches 30A and 30B at a time in order to cause either deployment or retraction of flight control surface 16. As described above, driving rotors 33 may rotate with driving member 22 and may be coupled to driving member 22 directly or indirectly. For example, driving rotors 33 may be coupled to driving member 22 via intermediate support 57. Similarly, driven rotors 35 may be directly or indirectly coupled to gears 34. In various embodiments, a plurality of driving rotors 33 may be alternately stacked with a plurality of driven rotors 35 but without physically contacting driven rotors 35. For example, driving rotors 33 and driven rotors 35 may be spaced apart by a gap which may be at least partially filled with MR fluid 46 (not shown in FIGS. 7A and 7B) or ER fluid. The application of magnetic field F (or electric field for ER fluid) may cause the activation of MR fluid 46 to cause engagement of driving rotors 33 with driven rotors 35 and consequently cause deployment or retraction of flight control surface 16.

Figure 8:
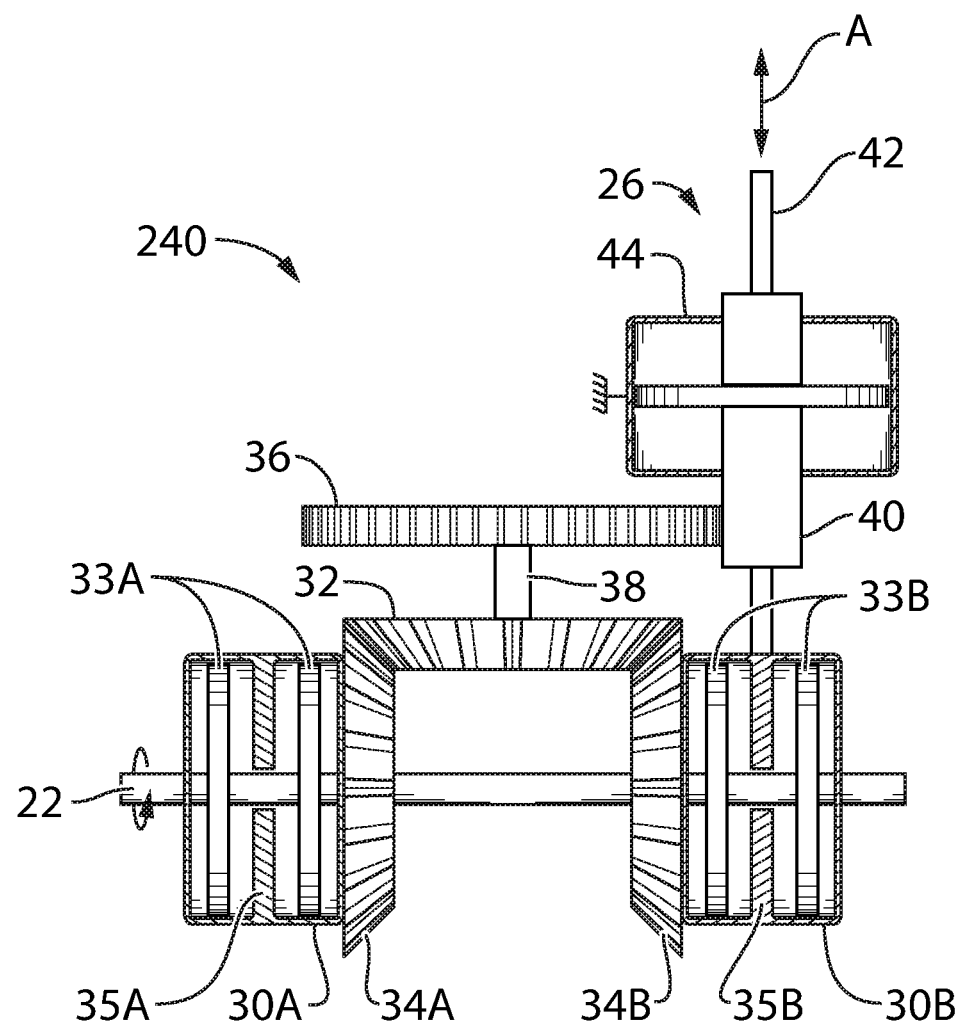
FIG. 8 is a detailed schematic representation of a power transfer device of FIG. 3 according to another embodiment.

FIG. 8 is a detailed schematic representation of power transfer device 240 according to another embodiment. In this embodiment, brake 44 may, when activated, be configured to be coupled directly to nut 40 in order to prevent rotation of nut 40 and thereby prevent movement of screw 42 of actuator 26. Similarly to power transfer device 24 shown in FIG. 4, brake 44 may serve to substantially hold a position of an associated flight control surface 16 during flight or other situations where clutches 30A and 30B may be disengaged. The coupling of brake 44 directly to nut 40 may reduce or eliminate backlash (e.g., between intermediate gear 36 and nut 40) when brake 44 is holding an associated flight control surface 16 in place.

Figure 9B:
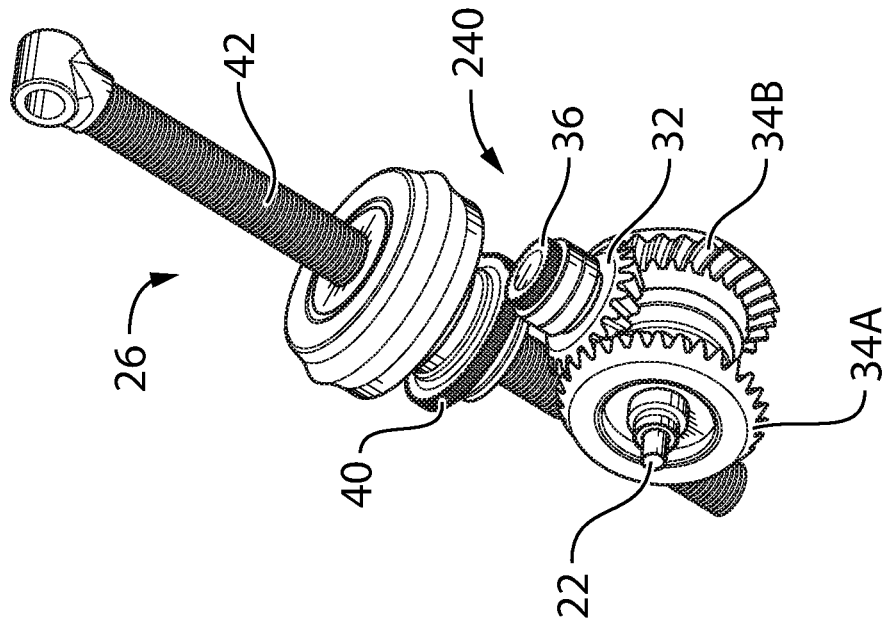
FIG. 9B is an axonometric view of the power transfer device of FIG. 8 with the casings removed.
Figure 9A:
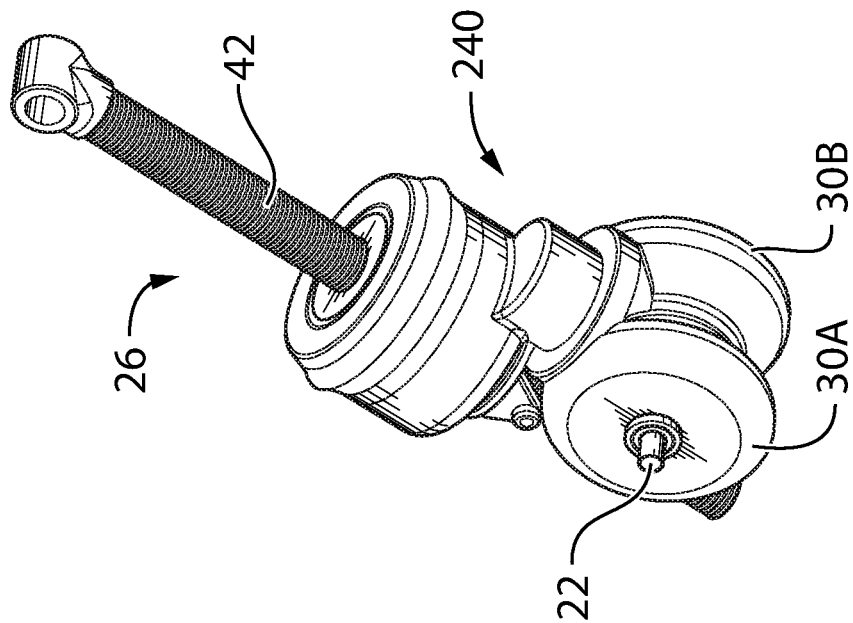
FIG. 9A is an axonometric view of the power transfer device of FIG. 8 assembled with casings.

FIG. 9A is an axonometric view of power transfer device 240 and actuator 26 assembled with casings and FIG. 9B is an axonometric view of power transfer device 240 and actuator 26 with the casings removed.

Figure 10:
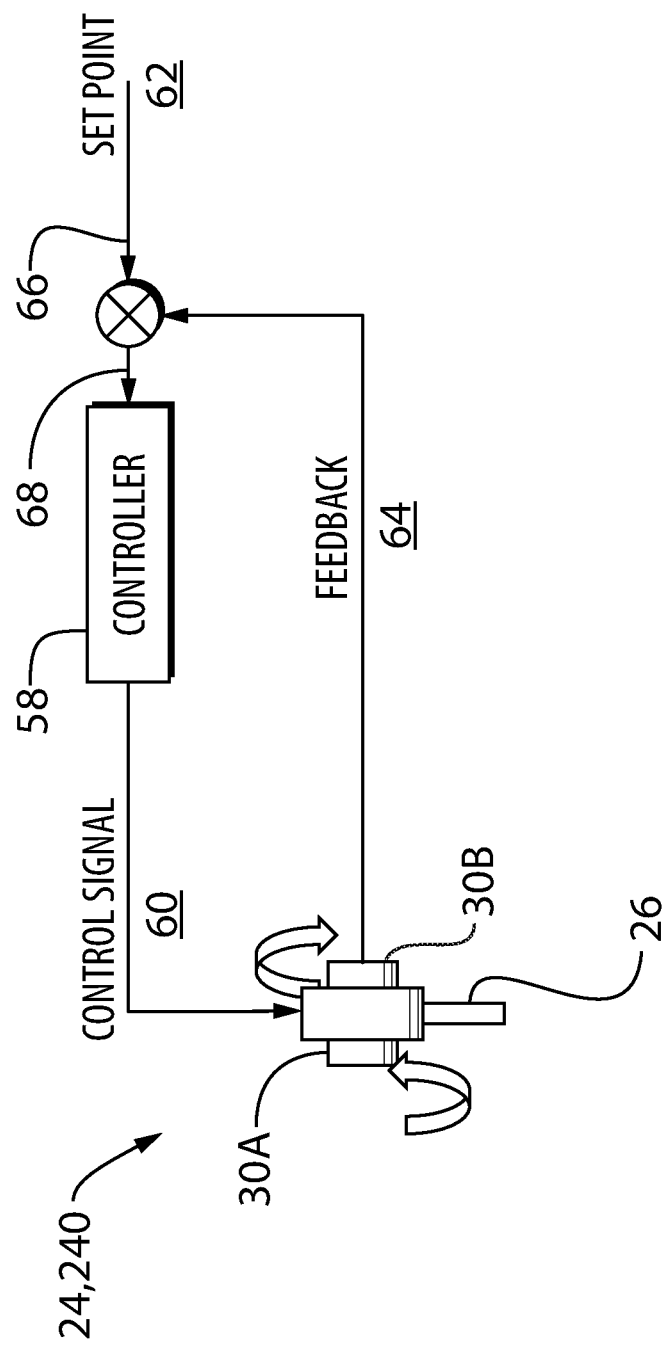
FIG. 10 is a schematic representation of a power transfer device of FIG. 3 coupled to an exemplary controller.

FIG. 10 is a schematic representation of power transfer device 24, 240 coupled to an exemplary controller 58. Controller 58 may be configured to generate one or more output control signals 60 (referred hereinafter as "control signal 60") to one or more power transfer devices 24, 240. Control signal 60 may, for example, comprise or be representative of control current(s) delivered to coil(s) 56 of clutches 30A and 30B for the purpose of controlling the intensity of magnetic field F and thereby control the slippage of each of clutches 30A and 30B. Control signal 60 may be generated by controller 58 based on one or more set points 62 (referred hereinafter as "set point 62") and one or more feedback signals 64 (referred hereinafter as "feedback signal 64"). Set point 62 may be representative of one or more desired speeds and/or positions of an associated flight control surface 16. Feedback signal 64 may be representative of one or more actual speeds and/or positions of the associated flight control surface 16. Summer 66 may receive set point 62 and feedback 64 and generate one or more error signals 68 for use by controller 58 for the generation of control signal 60. Controller 58 may operate according to known or other suitable control algorithms. In various embodiments, controller 58 may be configured to conduct one or more of proportional, derivative and integral control.

Controller 58 may have a different configuration than that shown and/or described herein. For example, power transfer device 24, 240 may be controlled via any suitable form of feedback law(s). In various embodiments, controller 58 may be implemented in analog form and/or digital form. For example, controller 58 may include one or more microcontrollers or other suitably programmed or programmable logic circuits. In various embodiments, controller 58 may be incorporated with or operated in conjunction with a control system or subsystem of aircraft 10. Accordingly, controller 58 may be configured to communicate (e.g., transmit and/or receive data such as parameters, instructions, commands and status values) with one or more systems or subsystems of aircraft 10. For example, controller 58 may be part of an aircraft control system having a fly-by-wire configuration. Accordingly, the functionality of controller 58 may be integrated into and performed by one or more digital computer(s) or other data processors, sometimes referred to as flight control computers(s) (FCC) and related accessories that may control at least some aspects of performance of aircraft 10.

Controller 58 may also comprise memory(ies) including any storage means (e.g. devices) suitable for retrievably storing machine-readable instructions executable by one or more processors of controller 58. Such machine-readable instructions may be included in a computer program product. Memory(ies) may comprise any data storage devices suitable for storing data received and/or generated by controller 58, preferably retrievably. For example, memory(ies) may comprise media suitable for storing electronic data signals in volatile or non-volatile, non-transitory form.

Machine-readable instructions for execution by controller 58 may cause controller 58 to generate control signals 60 for controlling the operation of clutches 30A and 30B of one or more power transfer devices 24, 240 and thereby control the deployment and retraction or one or more flight control surfaces 16. For example, controller 58 may be configured to control the operation of a plurality of power transfer devices 24, 240 and thereby control the actuation of a plurality of flight control surfaces 16. In various embodiments, controller 58 may be configured to cause the individual actuation of one or more flight control surfaces 16 and/or the simultaneous actuation of a plurality of flight control surfaces 16 either differentially or in unison. In the case of simultaneous deployment of a plurality of flight control surfaces 16, controller 58 may, for example, be configured to carry out electronic gearing or camming where one of flight control surfaces 16 may be operated as a master and one or more other flight control surfaces 16 may be operated as one or more slaves. In various embodiments, preset positions (e.g., selectable during aircraft operation either during flight or on ground) for a plurality of flight control surfaces 16 may be stored and used by controller 58 to control the simultaneous and differential deployment or retraction of the plurality of flight control surfaces 16. Controller 58 may also be configured to control a single power transfer device 24, 240 or a plurality of power transfer devices 24, 240 associated with a single flight control surface 16 since it is understood that each flight control surface 16 may be associated with one or more power transfer devices 24, 240. For example, the operation of two or more power transfer devices 24, 240 may be coordinated to achieve actuation of a single flight control surface 16.

During operation, power transfer devices 24, 240 may be used for the differential actuation of flight control surfaces 16 or other flight control surfaces of fixed-wing aircraft. For example power transfer devices 24, 240 may be used to transfer power from a common source of power such as driving member 22 to a plurality of flight control surfaces 16 in an independent manner so that the power being transferred to one flight control surface 16 does not affect the power being transferred to another flight control surface 16.

Many fixed-wing aircraft comprise high-lift flight control surfaces which may be deployed and/or retracted to alter the performance of a wing during some phases of flight such as on take-off and during landing. However, existing high-lift system which comprise a plurality of flight control surfaces that can only be actuated simultaneously and in unison can limit the ability to further tailor (e.g., improve) the performance of the wings of fixed-wing aircraft during some phases of flight.

In various embodiments, the systems, components and apparatus disclosed herein may be useful for conducting methods for differentially actuating a plurality of flight control surfaces 16 of aircraft 10 using common movable driving member 22. Such methods may comprise: variably adjusting the power transferred from common movable driving member 22 to a first 16A (see FIG. 3) of the plurality of flight control surfaces 16; and independently of the power transferred to first flight control surface 16A, variably adjusting the power transferred from common movable driving member 22 to a second 16B of the plurality of flight control surfaces 16. As described above, variably adjusting the power transferred from common movable driving member 22 to at least one of first flight control surface 16A and second flight control surface 16B may comprises subjecting MR fluid 46 to magnetic field F or subjecting ER fluid to an electric field.

Power transfer devices 24, 240 may also be used to cause both deployment and retraction of an associated flight control surface 16A while common driving member 22 may be moving (e.g., rotating) in a single (i.e., constant) direction so that, for example, the direction of rotation of common driving member 22 may not need to be reversed in order to reverse the direction of actuation of flight control surface 16A. In various embodiments, this may be achieved by: adjusting the power transferred from common movable driving member 22 to the first flight control surface 16A to cause deployment of first flight control surface 16A based on actuation of common movable driving member 22 in a first direction; adjusting the power transferred from common movable driving member 22 to first flight control surface 16A and engaging brake 44 associated with first flight control surface 16A to cause stopping of first flight control surface 16; and adjusting the power transferred from common movable driving member 22 to first flight control surface 16A and at least partially disengaging brake 44 to cause retraction of first flight control surface 16A based on actuation of common movable driving member 22 in the first direction.

Similarly, one or more other power transfer devices 24, 240 may also be used to cause both deployment and retraction of another associated flight control surface 16B while common driving member 22 may be moving (e.g., rotating) in the same first direction. In various embodiments, this may be achieved by: adjusting the power transferred from common movable driving member 22 to second flight control surface 16B to cause deployment of the second flight control surface 16B based on actuation of common movable driving member 22 in the first direction; adjusting the power transferred from common movable driving member 22 to second flight control surface 16B to cause stopping of second flight control surface 16B; and adjusting the power transferred from common movable driving member 22 to second flight control surface 16B to cause retraction of second flight control surface 16B based on actuation of common movable driving member 22 in the first direction. Accordingly, the actuation of first flight control surface 16A and second flight control surface 16B in opposite directions while common movable driving member 22 is actuated in the first direction may be possible.

The speed of actuation of each of flight control surfaces 16A and 16B (see FIG. 3) may also be varied by varying the power being transferred to each of flight control surfaces 16A and 16B while not necessarily having to vary the speed of driving member 22. For example, adjusting an actuation speed of first flight control surface 16A may be conducted while common movable driving member 22 is actuated at a constant speed. Similarly, adjusting an actuation speed of second flight control surface 16B may be conducted while common movable driving member 22 is actuated at the constant speed. Using power transfer devices 24, 240, adjusting the actuation speed of second flight control surface 16B may be conducted independently of the actuation of first flight control surface 16A. Accordingly, adjustment of the power transferred from common movable driving member 22, via power transfer devices 24, 240 for example, may be used to actuate first flight control surface 16A and second flight control surface 16B at different actuation speeds.

As explained above, power transfer devices 24, 240 may comprise MR fluid 46 or ER fluid which may be used to cause coupling and decoupling of flight control surfaces to and from common driving member 22. Accordingly, one or more quantities of MR fluid 46 or ER fluid may be used in conjunction with the systems, apparatus and components described herein in order to perform various methods disclosed herein or other methods. Systems, apparatus and components described herein may be useful in transferring power to a flight control surface 16 from common driving member 22 or other suitable power source via MR fluid 46 or ER fluid. In various embodiments, a method for actuating a flight control surface of aircraft 10 may comprise: activating a source of power (e.g., common driving member 22); and subjecting MR fluid 46 to magnetic field F to cause transfer of power from the source of power to flight control surface 16. Subjecting MR fluid 46 to magnetic field F may comprise adjusting an intensity of magnetic field F to adjust an amount of power being transferred to flight control surface 16 and/or adjust an actuation speed of flight control surface 16. Brake(s) 44 may be partially or fully disengaged (i.e., released) when one of clutches 30A and 30B is engaged and flight control surface 16 is actuated.

MR fluid 46 may also be used to cause both deployment and retraction of an associated flight control surface 16 while common driving member 22 may be moving (e.g., rotating) in a single direction so that, for example, the direction of rotation of common driving member 22 may not need to be reversed in order to reverse the direction of actuation of flight control surface 16. This may be achieved via two quantities of MR fluid 46 (e.g., a first quantity in first clutch 30A and a second quantity in second clutch 30B). Accordingly, this may be achieved by: subjecting the first quantity of MR fluid 46 to a first magnetic field to cause deployment of flight control surface 16; at least partially removing the first magnetic field from the first quantity of MR fluid 46; and subjecting the second quantity of MR fluid 46 to a second magnetic field to cause retraction of flight control surface 16. The use of MR fluid 46 may also be used to vary the speed of actuation of flight control surface 16 while not necessarily having to vary the speed of driving member 22.

The above description is meant to be exemplary only, and one skilled in the relevant arts will recognize that changes may be made to the embodiments described without departing from the scope of the invention disclosed. Also, it should be understood in view of the present disclosure that while the systems, apparatus, components and methods disclosed and shown herein may comprise a specific number of elements/components, the systems, apparatus, components and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An apparatus for differentially actuating a plurality of flight control surfaces of a fixed-wing aircraft, the apparatus comprising:
   a common movable driving member for actuating the plurality of flight control surfaces;
   a first power transfer device configured to variably adjust power transfer from the common movable driving member to a first of the plurality of flight control surfaces;
   a second power transfer device configured to, independently of the power transferred to the first flight control surface, variably adjust power transfer from the common movable driving member to a second of the plurality of flight control surfaces;
   a linear actuator configured to transfer power from the first power transfer device to the first flight control surface, the linear actuator comprising a nut engaged with a screw; and
   a brake for holding the first flight control surface at a desired position, the brake being directly coupled to the nut thereby preventing movement of the screw of the actuator,
   wherein at least one of the first power transfer device and the second power transfer device comprises a clutch configured for controllable slippage.

2. The apparatus as defined in claim 1, wherein at least one of the first power transfer device and the second power transfer device comprises one of magneto-rheological fluid and electro-rheological fluid.

3. The apparatus as defined in claim 1, wherein the first power transfer device deploys and retracts the first flight control surface through actuation of the movable driving member in a first direction.

4. The apparatus as defined in claim 3, wherein the second power transfer device deploys and retracts the second flight control surface through actuation of the movable driving member in the first direction.

5. The apparatus as defined in claim 1, wherein:
   the clutch is a first clutch; and
   the first power transfer device comprises the first clutch and a second clutch cooperating to permit deployment and retraction of the first flight control surface.

6. The apparatus as defined in claim 5, wherein at least one of the first clutch and the second clutch comprises one of magneto-rheological fluid and electro-rheological fluid.

7. The apparatus as defined in claim 1, wherein the first power transfer device adjusts an actuation speed of the first flight control surface through actuation of the movable driving member.

8. The apparatus as defined in claim 1, wherein the second power transfer device adjusts an actuation speed of the second flight control surface independently of the actuation of the first flight control surface.

9. The apparatus as defined in claim 1, wherein the brake is a first brake and the desired position is a first desired position, the apparatus comprising a second brake for holding the second flight control surface at a second desired position.

10. An apparatus for actuating a flight control surface of a fixed-wing aircraft, the apparatus comprising:
    a source of power for actuating the flight control surface;
    a power transfer device configured to transfer power from the source of power to the flight control surface, the power transfer device comprising one of magneto-rheological fluid and electro-rheological fluid;
    a linear actuator configured to transfer power from the power transfer device to the flight control surface, the linear actuator comprising a nut engaged with a screw; and
    a brake for holding the flight control surface at a desired position, the brake being directly coupled to the nut thereby preventing movement of the screw of the actuator,
    wherein the power transfer device comprises a clutch configured for controllable slippage.

11. The apparatus as defined in claim 10, wherein the source of power comprises a rotatable driving member.

12. The apparatus as defined in claim 11, wherein the power transfer device deploys and retracts the flight control surface through rotation of the rotatable driving member in a first direction.

13. The apparatus as defined in claim 10, wherein:
the clutch is a first clutch; and
the power transfer device comprises the first clutch and a second clutch cooperating to permit deployment and retraction of the flight control surface.

14. The apparatus as defined in claim 13, wherein the first clutch and the second clutch comprise one of magneto-rheological fluid and electro-rheological fluid.

15. The apparatus as defined in claim 11, wherein the power transfer device adjusts an actuation speed of the flight control surface through rotation of the rotatable driving member.

16. A method for differentially actuating a plurality of flight control surfaces of a fixed-wing aircraft using a common movable driving member and linear actuators each comprising a nut engaged with a screw, the method comprising:
variably adjusting the power transferred from the common movable driving member to a first of the plurality of flight control surfaces through a first clutch configured for controllable slippage;
independently of the power transferred to the first flight control surface, variably adjusting the power transferred from the common movable driving member to a second of the plurality of flight control surfaces through a second clutch; and
holding each of first flight control surfaces at a desired position with a brake, the brake being directly coupled to the nut thereby preventing movement of the screw of the actuator.

17. An apparatus for differentially actuating a plurality of actuatable members, the apparatus comprising:
a common movable driving member for actuating the plurality of actuatable members;
a first power transfer device configured to variably adjust power transfer from the common movable driving member to a first of the plurality of actuatable members;
a second power transfer device configured to, independently of the power transferred to the first actuatable member, variably adjust power transfer from the common movable driving member to a second of the plurality of actuatable members;
a linear actuator configured to transfer power from the first power transfer device to the first actuatable member, the linear actuator comprising a nut engaged with a screw; and
a brake for holding the first actuatable member at a desired position, the brake being directly coupled to the nut thereby preventing movement of the screw of the actuator,
wherein at least one of the first power transfer device and the second power transfer device comprises a clutch configured for controllable slippage.

18. The apparatus as defined in claim 17, wherein at least one of the first power transfer device and the second power transfer device comprises one of magneto-rheological fluid and electro-rheological fluid.

* * * * *